United States Patent Office.

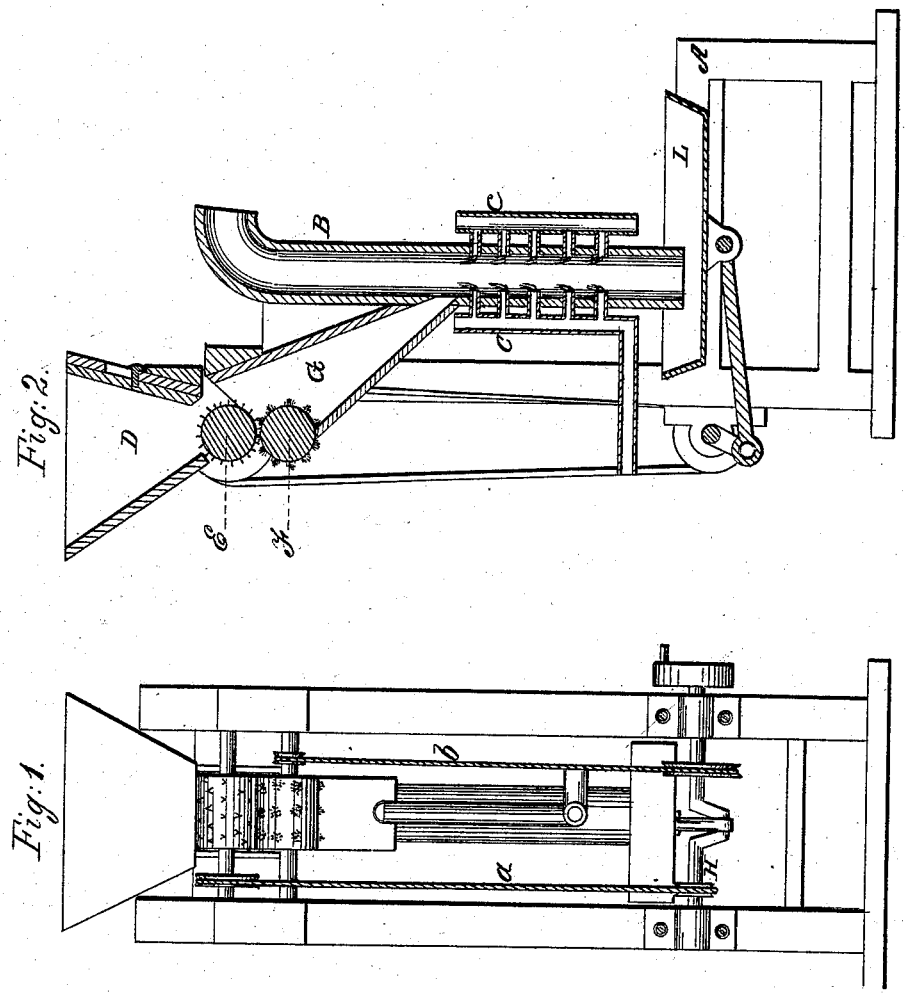

THOMAS W. BROWN, OF CUDWORTH, BARNSLEY, ENGLAND.

Letters Patent No. 80,593, dated August 4, 1868.

IMPROVEMENT IN COTTON-SEED CLEANER.

The Schedule referred to in these Letters Patent and making part of the same.

TO ALL WHOM IT MAY CONCERN:

Be it known that I, THOMAS W. BROWN, of Cudworth, Barnsley, in the county of York, England, have invented a new and useful Improvement in Machines for Cleaning the Fibre from the Hull of Cotton-Seed; and I do hereby declare that the following is a full, clear, and exact description thereof, which will enable others skilled in the art to make and use the same, reference being had to the accompanying drawings, forming part of this specification.

The nature of my invention relates to improvements in machinery for removing the fibre from the hull of cotton-seed, whereby it is designed to accomplish the same in a more expeditious and a cheaper manner than has been heretofore done; and it consists essentially in accomplishing the same by the application of heat, under such arrangements of apparatus, and by such applications, as shall be found most advantageous of the same.

The plan which I have adopted in this example, as one application of my invention, and which I at present prefer as the best, consists of a vertical or nearly vertical tube or funnel, preferably made of iron supported in a suitable frame, into which jets of gas, or oil, or other similar inflammable substance are introduced at suitable points, whereby an intense flame is produced within the said tube, through which the seed to be cleaned is caused to pass in a downward direction, with such rapidity that, while the seed is relieved of a considerable portion of the adhering fibre, it is not exposed to the heat long enough to affect the seed. The said heating-tube is provided with a feeding-apparatus, to convey the seed from a hopper, into which it is thrown, to be fed into the heater, and also with a reciprocating pan below the same, into which the seed is discharged after passing through the heater, when it is agitated, to prevent burning, and to cool it as soon as possible.

On reference to the accompanying drawings—

Figure 1 represents a front elevation of my improved apparatus, and

Figure 2 represents a sectional elevation of the same.

Similar letters of reference indicate corresponding parts.

A represents a suitable frame, on which is supported, in a vertical or nearly vertical position, a funnel or heater, B, which I prefer to make of iron. C represents a gas-pipe, provided with numerous branches communicating with the interior of the heater B. D represents a hopper, into which the seed is placed, to be fed to the heater through the spout G. E represents a toothed roller, which is actuated from the driving-shaft H by the belt $a$, in a direction to move the seed downward towards the spout G. F is a roller provided with brushes, which is also actuated from the driving-shaft by a belt, $b$, in the same direction as the roller E, and with greater velocity, whereby the seeds are brushed off the roller E, which are inclined to adhere to the same, by reason of the fibre adhering to them. I represents a reciprocating trough or pan, into which the seed falls from the heater B, which receives motion from a crank on the driving-shaft, through a connecting-rod, as shown in fig. 2, whereby the seed is violently agitated and exposed to the air, so as to cool quickly after having passed through the heater.

The gas-jets are ignited within the heater, forming a strong flame by their united capacity, which rises upward in the centre of the heater, and heats the same to great intensity, whereby the fibre is considerably scorched and crisped by falling through the heater, and is more or less broken off from the hull by the agitation caused by the reciprocating pan I.

To prevent the heat from having any injurious effects upon the kernel, I propose to pass the seed several times through the heater, taking care that the heat is so regulated to the time of passage of the seed, that it may have the greatest amount of effect on the fibre, without heating the kernel too much, and exposing the same to the agitation of the pan I each time, until the fibre is all removed from the seed, when a fresh lot may be supplied. By this process of repeatedly exposing the seed momentarily to an intense heat, and then cooling and agitating it, I have found that the removal of the fibre may be very cheaply and efficiently accomplished.

I do not confine myself to the device herein shown for effecting the same, as various other devices may be used with great advantage, without departing from the spirit of my invention; as, for instance, a flat plate of metal may be arranged over a fire of coal or wood, in an inclined position, and the seed be caused to slide down the same; or a revolving hollow cylinder may be placed in an inclined position over a fire, and the seed be caused to pass through that, and it may be agitated and exposed to the air in a convey or on elevators, which may be arranged to receive the seed at the bottom of the said plate or cylinders, to carry it back to the hopper again; and various other obvious methods may be employed.

I claim as new, and desire to secure by Letters Patent—

1. Removing the fibre from the hull of cotton-seed, by successively heating and cooling the same, by means substantially such as herein shown and described, and for the purpose set forth.

2. The combination, with the heater B, of the feeding-rollers E F, hopper D, and spout G, substantially as and for the purpose herein shown and described.

3. The combination, with the heater B, of the agitating-pan L, substantially as and for the purposes described.

The above specification of my invention signed by me, this 9th day of March, 1868.

THOS. W. BROWN.

Witnesses:
WM. F. McNAMARA,
ALEX. F. ROBERTS.